(12) United States Patent
Mishra et al.

(10) Patent No.: US 10,356,440 B2
(45) Date of Patent: Jul. 16, 2019

(54) SCALABLE TRANSFORM HARDWARE ARCHITECTURE WITH IMPROVED TRANSPOSE BUFFER

(71) Applicant: QUALCOMM Incorporated, San Diego, CA (US)

(72) Inventors: Ashish Mishra, Bangalore (IN); Vikash Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 14/503,920

(22) Filed: Oct. 1, 2014

(65) Prior Publication Data
US 2016/0100193 A1    Apr. 7, 2016

(51) Int. Cl.
| | |
|---|---|
| *H04N 19/423* | (2014.01) |
| *H04N 19/625* | (2014.01) |
| *H04N 19/44* | (2014.01) |
| *H04N 19/61* | (2014.01) |
| *H04N 19/91* | (2014.01) |

(Continued)

(52) U.S. Cl.
CPC ........... *H04N 19/625* (2014.11); *G06F 17/16* (2013.01); *H04N 19/423* (2014.11); *H04N 19/427* (2014.11); *H04N 19/44* (2014.11); *H04N 19/61* (2014.11); *H04N 19/91* (2014.11)

(58) Field of Classification Search
None
See application file for complete search history.

(56) References Cited

U.S. PATENT DOCUMENTS

| | | | | |
|---|---|---|---|---|
| 4,464,726 A | * | 8/1984 | Chiang | G06J 1/00 257/239 |
| 4,791,598 A | * | 12/1988 | Liou | G06F 17/147 708/401 |

(Continued)

FOREIGN PATENT DOCUMENTS

| | | |
|---|---|---|
| CN | 103634598 A | 3/2014 |
| CN | 103731671 A | 4/2014 |

(Continued)

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

(Continued)

*Primary Examiner* — Jayanti K Patel
*Assistant Examiner* — Shadan E Haghani
(74) *Attorney, Agent, or Firm* — Shumaker & Sieffert, P.A.

(57) ABSTRACT

As the quality and quantity of shared video content increases, video encoding standards and techniques are being developed and improved to reduce bandwidth consumption over telecommunication and other networks. One such technique for compressing videos involves transforming image data into an alternate, encoding-friendly domain (e.g., by a two-dimensional discrete cosine transform). Transform modules may be implemented to perform these transformations, which may occur during both video encoding and decoding processes. Provided are exemplary techniques for improving the efficiency and performance of transform module implementations.

29 Claims, 8 Drawing Sheets

(51) Int. Cl.
*G06F 17/16* (2006.01)
*H04N 19/426* (2014.01)

(56) References Cited

U.S. PATENT DOCUMENTS

| | | | | |
|---|---|---|---|---|
| 5,299,025 | A * | 3/1994 | Shirasawa | H04N 19/60 358/400 |
| 5,345,408 | A * | 9/1994 | Hoogenboom | G06F 17/147 708/402 |
| 5,550,765 | A * | 8/1996 | Bhattacharya | G06F 17/147 708/401 |
| 5,583,803 | A * | 12/1996 | Matsumoto | G06F 17/147 708/401 |
| 5,594,812 | A * | 1/1997 | Boliek | G06F 17/147 375/E7.14 |
| 5,805,482 | A * | 9/1998 | Phillips | G06F 17/147 708/402 |
| 5,818,532 | A * | 10/1998 | Malladi | H04N 19/00 375/240.03 |
| 5,867,414 | A * | 2/1999 | Kao | G06F 17/16 708/607 |
| 5,875,266 | A * | 2/1999 | Fukuda | H04N 19/176 375/E7.093 |
| 6,026,217 | A | 2/2000 | Adiletta | |
| 6,038,580 | A * | 3/2000 | Yeh | G06F 17/141 708/401 |
| 6,104,434 | A * | 8/2000 | Nakagawa | H04N 19/105 375/240.16 |
| 6,507,614 | B1 * | 1/2003 | Li | H04N 19/61 375/240.03 |
| 6,757,343 | B1 * | 6/2004 | Ortega | G06F 17/148 375/240.19 |
| 7,292,730 | B1 * | 11/2007 | Lippincott | G06F 17/147 348/395.1 |
| 8,977,064 | B2 | 3/2015 | Hwang et al. | |
| 2006/0072846 | A1 | 4/2006 | Song | |
| 2006/0104521 | A1 * | 5/2006 | Teng | H04N 19/436 382/232 |
| 2006/0126729 | A1 * | 6/2006 | Nakayama | H04N 19/176 375/240.03 |
| 2006/0129622 | A1 * | 6/2006 | Dang | G06F 17/147 708/406 |
| 2007/0098081 | A1 * | 5/2007 | Vajhallya | G06F 17/147 375/240.25 |
| 2009/0034623 | A1 | 2/2009 | Kuroki | |
| 2009/0080515 | A1 | 3/2009 | Nagaraj et al. | |
| 2013/0243083 | A1 * | 9/2013 | Sezer | H04N 19/60 375/240.02 |
| 2014/0044165 | A1 * | 2/2014 | Chiu | H04N 19/176 375/240.03 |

FOREIGN PATENT DOCUMENTS

| | | | | |
|---|---|---|---|---|
| WO | WO 2007024413 | A2 * | 3/2007 | H04N 19/122 |
| WO | WO-2007024413 | A2 | 3/2007 | |
| WO | WO-2009103002 | A1 | 8/2009 | |

OTHER PUBLICATIONS

Bross, B., et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

ITU-T H.265, Series H: Audiovisual and Multimedia Systems, Infrastructure of audiovisual services—Coding of moving video, High efficiency video coding, The International Telecommunication Union, Apr. 2013, 317 pp.

International Search Report and Written Opinion—PCT/US2015/045880—ISA/EPO—dated Oct. 22, 2015.

Lenart T., et al., "A Hardware Acceleration Platform for Digital Holographic Imaging", Journal of Signal Processing Systems Signal, Image, and Video Technology (Formerly the Journal of VLSI Signal Processing Systems for Signal, Image, Video Technology), Springer US, Boston, vol. 52, No. 3, Feb. 28, 2008 (Feb. 28, 2008), pp. 297-311, XP019616686.

* cited by examiner

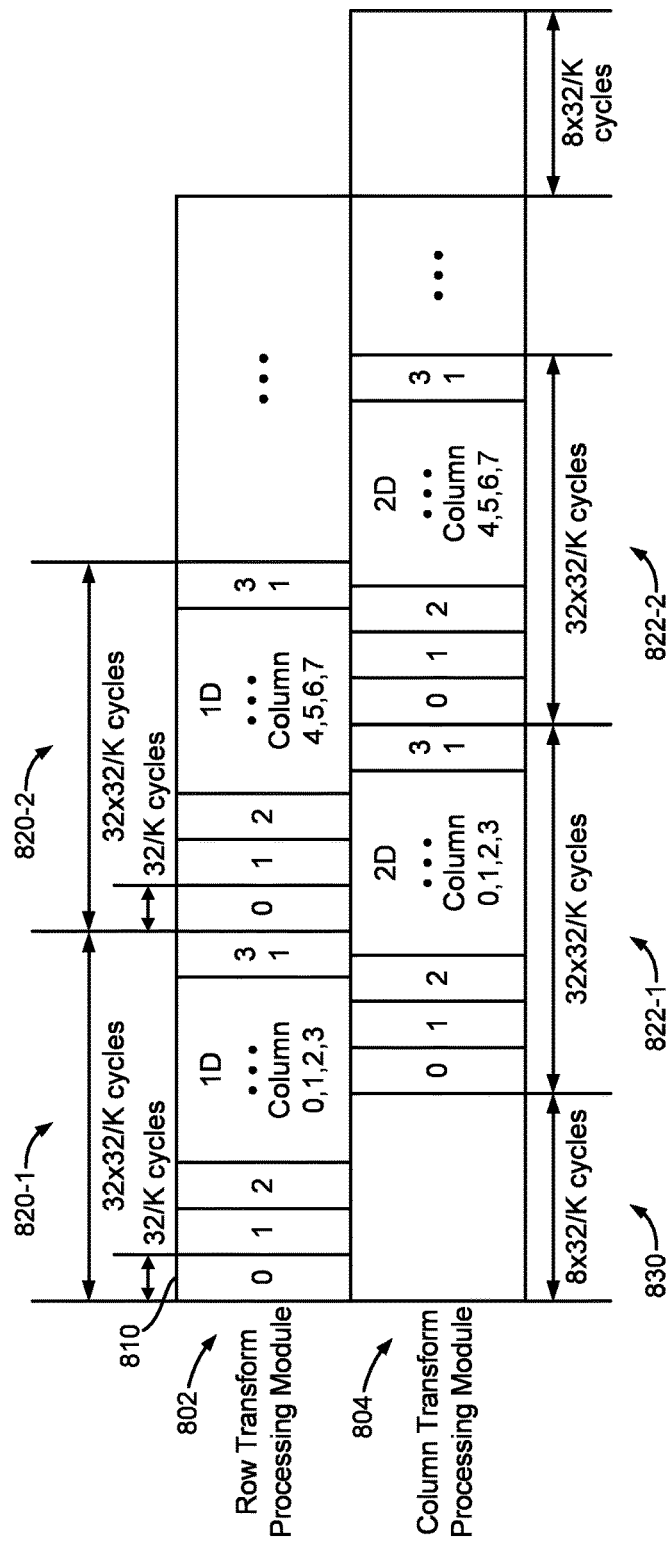

SCALABLE TRANSFORM HARDWARE ARCHITECTURE WITH IMPROVED TRANSPOSE BUFFER

BACKGROUND

1. Technical Field

The present application generally relates to video coding and, more specifically, to hardware implementations of image transforms.

2. Related Art

Image transforms are commonly used for encoding and decoding image and video data. Video codecs such as those used in High Efficiency Video Coding (HEVC) use discrete cosine transforms (DCT) and inverse discrete cosine transforms (IDCT) because of the transforms' superior energy compaction performance. These codecs can be implemented in mobile devices, smart TVs, and many other video applications. For mobile applications in particular, the die size and efficiency of the hardware implementations of DCTs are especially critical.

Typically, a given image or video frame is segmented into macroblocks or transform units (TU) upon which transform modules may operate. The transform modules can include discrete stages for row and column processing. A transpose buffer is typically located between the row and column transform stages to collect and store the output of the first stage and transfer the output to the second stage at an appropriate time.

SUMMARY

Disclosed are techniques for implementing improved transform modules that aim to provide high performance on an optimal chip area, as well as systems incorporating improved transform modules. For example, the proposed transform module may be implemented in a video coder (e.g., a video encoder and/or a video decoder). The transform modules may be scalable for various resolutions and frame per second (FPS) requirements. The transform modules may further be implemented to address memory (e.g., input buffer) read bandwidth issues. In general, by taking into account a limited read bandwidth and a processing cycle budget, the proposed systems and techniques may minimize the die area required by transform modules while maintaining sufficient throughput to meet various system requirements.

In some embodiments, a transform module may comprise a first transform stage, a transpose buffer, and a second transform stage. The first transform stage (e.g., a row transform processing module) may comprise a plurality of processing engines that may be similar in structure and may simultaneously operate on an N×N block of input values (e.g., pixel values or transform coefficients in a frequency domain) received from an input buffer. The input values may be multiplied by transform-dependent coefficients and accumulated to generate intermediate values over a period of N/K cycles, where K represents the read bandwidth of the input buffer. After N/K cycles the accumulated value may be sent from the first transform stage to a transpose buffer.

The transpose buffer may have a size (e.g., 2×8×4) that is smaller than the input block size (e.g., 32×32). In fact, the transpose buffer size may be selected independently of the block size. Also, the transpose buffer size may be independent of the performance requirements (e.g., frames per second requirements). The transpose buffer may be implemented as a ping-pong buffer, thereby allowing the first transform stage to write to the transpose buffer during a time when a second transform stage is reading from the transpose buffer. The transpose buffer may transpose and transfer intermediate values received from the first transform stage to the second transform stage (e.g., column transform processing module). The intermediate values may be stored in the transpose buffer for less time on average, which allows the second transform stage to start working on the same block as the first transform stage simultaneously and earlier than may be possible by conventional methods.

BRIEF DESCRIPTION OF THE DRAWINGS

Features, aspects, and embodiments of the disclosure are described in conjunction with the attached drawings, in which:

FIG. 8 shows a timing diagram illustrating the activity of two transform stages when generating successive block segments of an input block.

These exemplary figures and embodiments are to provide a written, detailed description of the subject matter set forth by any claims that issue from the present application. These exemplary figures and embodiments should not be used to limit the scope of any such claims.

Further, although similar reference numbers may be used to refer to similar structures for convenience, each of the various example embodiments may be considered to be distinct variations.

DETAILED DESCRIPTION

Figure 1:
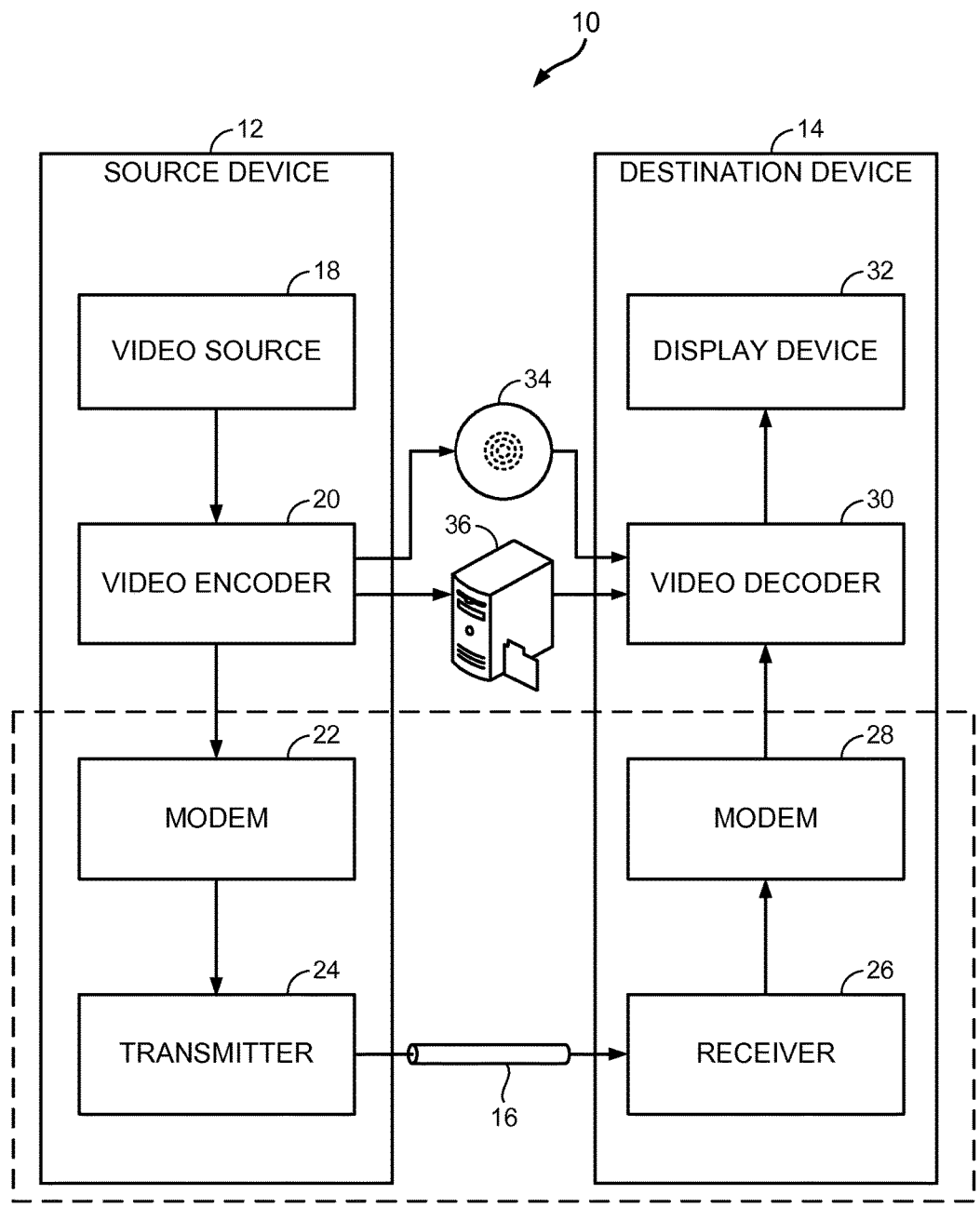
FIG. 1 shows a block diagram illustrating an example of a video encoding and decoding system that may be configured to utilize techniques for efficient image transforms in accordance with the principles of the present disclosure.

FIG. 1 shows a block diagram illustrating an example of a video encoding and decoding system 10 that may be configured to utilize techniques for efficient image transforms in accordance with the principles of the present disclosure. As shown in FIG. 1, the system 10 includes a source device 12 that transmits encoded video to a destination device 14 via a communication channel 16. Encoded video may also be stored on a storage medium 34 or a file server 36 and may be accessed by the destination device 14 as desired. The source device 12 and the destination device 14 may comprise any of a wide variety of devices including desktop computers, notebook (e.g., laptop) computers, tablet computers, set-top boxes, telephone handsets (e.g., smartphones or other personal communication devices), televisions, cameras, display devices, digital media players, video gaming consoles, mobile devices, and the like. In many cases, such devices may be equipped for wireless communication, wired communication, or both. Accordingly, the communication channel 16 may comprise a wireless channel (e.g., a Wi-Fi connection), a wired channel (e.g., DSL, cable modem, Ethernet, USB), or a combination of wireless and wired channels suitable for transmission of encoded video data.

The principles of the present disclosure may be applied to video coding in support of any of a variety of multimedia applications, such as over-the-air television broadcasts, cable television transmissions, satellite television transmissions, streaming video transmissions (e.g., via the internet), encoding of digital video for storage on a data storage medium, decoding of digital video stored on a data storage medium, and other applications.

In some embodiments, the devices 12, 14 may operate in a substantially symmetrical manner, such that each of the devices 12, 14 includes video encoding and decoding components. Accordingly, the system 10 may be configured to support both one-way and two-way video transmission to support applications such as video streaming, video playback, video broadcasting, and video telephony.

In the embodiment shown in FIG. 1, the source device 12 includes a video source 18, a video encoder 20, a modulator/demodulator (modem) 22, and a transmitter 24. The video source 18 may comprise any combination or individual instances of a video capture device (e.g., video camera), a video archive containing previously captured video, a video feed interface operable to receive video from a video content provider, and a computer graphics system for generating computer graphics data as the source video. In some embodiments, the video source 18 may be a video camera, and the source device 12 and the destination device 14 may form camera phones or video phones. However, the techniques described in this disclosure are applicable to video coding in general, and may be applied to wireless and/or wired applications.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers, and other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, a network attached storage (NAS) device, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an internet connection. This may include a wireless channel (e.g., a Wi-Fi connection), a wired connection (e.g., DSL, cable modem, Ethernet, USB), or a combination of both that is suitable for accessing encoded video data stored on a file server.

In the example of FIG. 1, the destination device 14 includes a receiver 26, a modem 28, a video decoder 30, and a display device 32. The receiver 26 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding and decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the embodiment shown in FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide area network, or a global network (e.g., the internet). The communication channel 16 generally represents any suitable communication medium, or collection of different communication media, for transmitting video data from the source device 12 to the destination device 14 or bi-directionally between the source device 12 and the destination device 14. The communication channel 16 may include routers, switches, base stations, or any other equipment that may be useful to facilitate communication between the source device 12 and the destination device 14.

The High Efficiency Video Coding (HEVC) standard is being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 7" is downloadable from http://phenix.it-sudparis.eu/jct/doc_end_user/documents/9_Geneva/wg11/JCTVC-I1003-v3, as of Jun. 7, 2012. The full citation for the HEVC Working Draft 7 is document JCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012. An additional recent draft of the HEVC standard, referred to as "HEVC Working Draft (WD) 8," is available from http://phenix.int-evry.fr/jct/doc_end_user/documents/10_Stockholm/wg11/JCTVC-J1003-v8.zip. The approved HEVC specification can be found at http://www.itu.int/rec/T-REC-H.265-201304-I, as of April 2013. Each of the references set forth in the present paragraph is incorporated by reference in its entirety herein.

The video encoder 20 and the video decoder 30 may operate according to a video compression standard, such as the HEVC standard or extensions to the HEVC standard. Alternatively or additionally, the video encoder 20 and the video decoder 30 may operate according to other proprietary or industry standards, such as the International Telecommunication Union Telecommunication Standardization Sector (ITU-T) H.264 standard, alternatively referred to as MPEG-4, Part 10, Advanced Video Coding (AVC), or extensions of such standards. Other examples may include VP9, MPEG-2, and ITU-T H.263. The techniques of this disclosure, however, are not limited to any particular coding standard or technique.

Although not shown in FIG. 1, in some aspects, the video encoder 20 and the video decoder 30 may each be integrated with an audio encoder and decoder, and may include appropriate multiplexing and demultiplexing modules, or other hardware and/or software, to handle the encoding of both audio and video in a common data stream or separate data streams. If applicable, in some embodiments, the multiplexing and demultiplexing modules may conform to the ITU H.223 multiplexer protocol, or other protocols such as the user datagram protocol (UDP).

A video coder, as described in this disclosure, may refer to a video encoder, a video decoder, or both. The video encoder 20 and the video decoder 30 may each be implemented as any of a variety of suitable coder circuitry, such as one or more microprocessors, digital signal processors (DSPs), application specific integrated circuits (ASICs), field programmable gate arrays (FPGAs), discrete logic, software, hardware, firmware, or any combinations thereof. When the techniques are implemented at least partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device. One or both of the video encoder 20 and the video decoder 30 may implement any or all of the techniques described in this disclosure to improve efficiency of image transforms.

Figure 2:
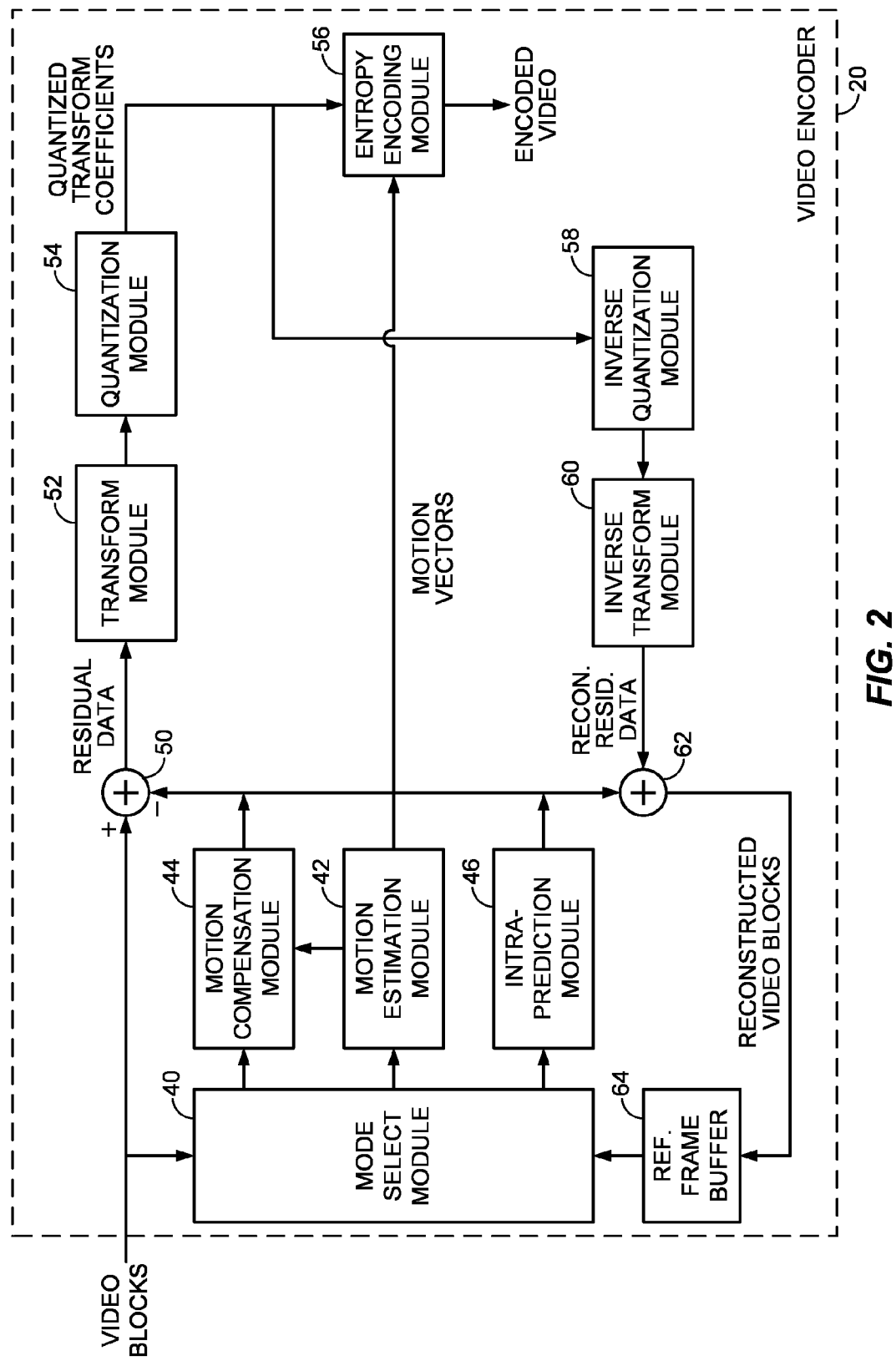
FIG. 2 shows a block diagram illustrating an example of a video encoder that may be implemented in accordance with the disclosed principles.

FIG. 2 shows a block diagram illustrating an example of a video encoder 20 that may be implemented in accordance with the disclosed principles. The video encoder 20 may be configured to perform any or all of the techniques for efficient image transforms as described in this disclosure. The video encoder 20 will be described in the context of HEVC for purposes of illustration, but without limitation of this disclosure as to other coding standards or methods that may implement image transforms. The video encoder 20 may perform intra- and inter-coding of coding units (CUs) within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. The previously coded frames may be before and/or after the current frame in a video sequence (e.g., within a group of pictures (GOP)). Intra-mode (I-mode) may refer to any of several spatial-based video compression modes. Inter-modes such as uni-directional prediction mode (P-mode) or bi-directional prediction mode (B-mode) may refer to any of several temporal-based video compression modes.

As shown in FIG. 2, the video encoder 20 receives a current video block within a video frame to be encoded. In the example of FIG. 2, the video encoder 20 includes a motion compensation module 44, a motion estimation module 42, an intra-prediction module 46, a reference frame buffer 64, a summer 50, a transform module 52, a quantization module 54, and an entropy encoding module 56. The transform module 52 applies a transform (e.g., discrete cosine transform (DCT)) to a block of residual data containing one or more transform units (TU). For video block reconstruction, the video encoder 20 also includes an inverse quantization module 58, an inverse transform module 60, and a summer 62. A deblocking filter (not shown) may also be included to filter block boundaries to remove blockiness artifacts from reconstructed video. If desired, the deblocking filter would typically filter the output of the summer 62. Additional filters (in-loop or post-loop) may also be used in addition to the deblocking filter. While the additional filters are not shown for brevity, they may be included at various locations within the video encoder 20, such as at the output of the summer 50 for in-loop filtering.

Although shown as separate functional modules for ease of illustration, the structure and functionality of any of the components within the video encoder 20 may be highly integrated with one another. For example, in some embodiments, the motion estimation module 42 may be highly integrated with the motion compensation module 44.

During the encoding process, the video encoder 20 receives a video frame or slice to be coded. The frame or slice may be divided into multiple video blocks, e.g., largest coding units (LCUs). The motion estimation module 42 and the motion compensation module 44 perform inter-prediction coding of the received video block relative to one or more blocks in one or more reference frames stored in the reference frame buffer 64 to provide temporal compression. The intra-prediction module 46 may perform intra-predictive coding of the received video block relative to one or more neighboring blocks in the same frame or slice as the block to be coded to provide spatial compression.

The mode select module 40 may select one of the coding modes (e.g., intra- or inter-), based on rate distortion analysis for each mode. Based on this selection, the resulting intra- or inter-coded block may be provided to the summer 50 to generate residual data representing a residual block and to the summer 62 to reconstruct the encoded block for use in a reference frame. The mode select module 40 may also provide syntax elements, such as intra-prediction mode indicators, motion vectors, partition information, and other such syntax information, to the entropy encoding module 56. Some video frames may be designated as I-frames, where all blocks in an I-frame are encoded in an intra-prediction mode. In some cases, the intra-prediction module 46 may also perform intra-prediction encoding of a block in a P- or B-frame, for example, when a motion search performed by the motion estimation module 42 does not result in a satisfactory prediction of the block.

As mentioned above, the motion estimation module 42 and the motion compensation module 44 may be highly integrated, but are illustrated separately for conceptual purposes. Motion estimation is the process of generating motion vectors, which estimate motion for video blocks. A motion vector, for example, may indicate the displacement of a prediction unit (PU) in a current frame relative to a reference sample in a reference frame. A reference sample may be a block that is found to closely match the portion of the CU including the PU being coded in terms of a pixel difference metric. The pixel difference metric may involve a sum of absolute difference (SAD), sum of square difference (SSD), or other difference metrics.

The motion estimation module 42 calculates a motion vector for a PU of an inter-coded frame by comparing the PU to reference samples of a reference frame stored in the reference frame buffer 64. In some examples, the video encoder 20 may calculate values for sub-integer pixel positions of reference frames stored in the reference frame buffer 64. For example, the video encoder 20 may calculate values of one-quarter pixel positions, one-eighth pixel positions, or other fractional pixel positions of the reference frame. Therefore, the motion estimation module 42 may perform a motion search relative to both the full and fractional pixel positions and output a motion vector with fractional pixel precision. The motion estimation module 42 may send the calculated motion vector to the entropy encoding module 56 and the motion compensation module 44.

Motion compensation, performed by the motion compensation module 44, may involve fetching or generating values for the PU based on the motion vector, which may be determined by the motion estimation module 42. Upon receiving the motion vector for the PU of the current video block, the motion compensation module 44 may locate a corresponding block to which the motion vector points in one of the reference frames. The summer 50 forms residual data representing a residual block by subtracting pixel values of the current video block being coded, forming pixel difference values, as discussed below. In general, the motion estimation module 42 performs motion estimation relative to luma components to calculate motion vectors, and the motion compensation module 44 uses the motion vectors for both chroma components and luma components.

The intra-prediction module 46 may intra-predictively encode the received block, as an alternative to inter-prediction performed by the motion estimation module 42 and the motion compensation module 44. The intra-prediction module 46 may encode the received block relative to neighboring, previously coded blocks, e.g., blocks above, above and to the right, above and to the left, or to the left of the current block, assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., thirty-three directional prediction modes, based on the size of the CU being encoded. The intra-prediction module 46 may also be configured with other types of prediction modes, e.g., a planar prediction mode and a DC prediction mode.

The intra-prediction module 46 may select an intra-prediction mode by, for example, calculating error values for various intra-prediction modes and selecting a mode that yields the lowest error value or the highest score by another metric. Directional prediction modes may include functions for combining values of spatially neighboring pixels and applying the combined values to one or more pixel positions in an associated PU. Once values for all pixel positions in a PU have been calculated, the intra-prediction module 46 may calculate an error value for the prediction mode based on pixel differences between the associated PU and the received block to be encoded. In some embodiments, the intra-prediction module may test every intra-prediction mode to determine which mode yields the lowest error value or the highest rating by another metric (e.g., rate-distortion). In some embodiments, the intra-prediction module 46 may continue testing intra-prediction modes until an intra-prediction mode that yields an acceptable error value or a sufficient rating by another metric is determined Testing a subset of the available intra-prediction modes may decrease the processing latency and processing bandwidth required.

The video encoder 20 determines residual data representing a residual block by subtracting the prediction data calculated by the motion compensation module 44 or the intra-prediction module 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences (e.g., error) between values of co-located pixels in the PU and in the original block to be coded. The differences may be chroma or luma differences depending on the type of block that is coded.

The transform module 52 may form one or more TUs from the residual block. The transform module 52 applies an image transform (e.g., two-dimensional transform), such as a discrete cosine transform (DCT), a discrete sine transform (DST), a discrete Fourier transform (DFT), a Hadamard transform, a wavelet transform, an integer transform, a sub-band transform, or another type of transform, to the TU, producing a video block comprising transform coefficients. The transform module 52 may be optimized to efficiently perform image transforms, as described further in this disclosure.

The transform module 52 may send the resulting transform coefficients to the quantization module 54, which may then quantize the transform coefficients. Quantization generally refers to a process in which transform coefficients are converted to a reduced set of discrete values, which results in increased efficiency (e.g., higher compression) at the cost of precision. The level of quantization may be adaptively determined, such that higher energy coefficients are quantized less than lower energy coefficients. Further, some of the lower energy coefficients may be set to a value of "0" after being quantized by the quantization module 54. This may allow for improved compression from entropy encoding, as described below.

Following quantization, the video encoder 20 may scan the transform coefficients, producing a one-dimensional vector from the two-dimensional matrix having the quantized transform coefficients. The scan may be designed to place lower frequency coefficients, which often have relatively higher energy, nearer to the front of the array and to place higher frequency coefficients nearer to the back of the array. In some examples, the video encoder 20 may use a predefined scan order (e.g., a zig-zag scan pattern) to scan the transform coefficients. In other examples, the video encoder 20 may perform an adaptive scan, and the selected scan order(s) may be encoded into the data stream. The scanning may be performed, e.g., by the entropy encoding module 56.

Once the transform coefficients are scanned, the entropy encoding module 56 may apply entropy coding such as context-adaptive variable-length coding (CAVLC), probability interval partitioning entropy (PIPE) coding, or context-based adaptive binary arithmetic coding (CABAC) to the coefficients. In addition, the entropy encoding module 56 may encode motion vector (MV) information and any of a variety of syntax elements useful in decoding the video data at a video decoder. These syntax elements may be used by a video decoder when reconstructing the encoded video data. Following the entropy coding by the entropy encoding module 56, the resulting encoded video may be transmitted to another device, such as a video decoder, or archived for later transmission or retrieval.

The inverse quantization module 58 and the inverse transform module 60 apply inverse quantization and inverse transformation, respectively, to reconstruct the residual block in the pixel domain, e.g., for creating a reference block for a reference frame that is stored in the reference frame buffer 64. The modules 58, 60 may be used to simulate portions of a video decoder, and accordingly may be substantially similar to corresponding modules present in a video decoder. The inverse transform module 60 may be implemented using a similar architecture as the transform module 52 and may therefore also benefit from the disclosed techniques.

The motion compensation module 44, in conjunction with the summer 62, may calculate a reference block by adding the residual block to a predictive block of one of the frames of the reference frame buffer 64. The motion compensation module 44 may also apply one or more interpolation filters to the reconstructed residual block to calculate sub-integer pixel values for use in motion estimation. The summer 62 may add the reconstructed residual block to the motion compensated prediction block produced by the motion compensation module 44 to produce a reconstructed video block for storage in the reference frame buffer 64. The reference frame buffer 64 may hold substantially the same video information that is received in a decoder, which may allow the video encoder 20 to accurately encode intra-prediction modes and motion vectors based on this common "state" information seen by the decoder during the time when the intra-prediction modes and motion vectors are applied.

The reconstructed video block stored in the reference frame buffer 64 may be used by the motion estimation module 42 and the motion compensation module 44 as a reference block to inter-code a block in another video frame. Additionally, or alternatively, the reconstructed video block may be used by the intra-prediction module 46 to intra-code a block in the same video frame. In some scenarios, a particular reference block may not be used for either intra-prediction or inter-prediction, but may merely be a part of a reference frame having other, useful reference blocks.

Figure 3:
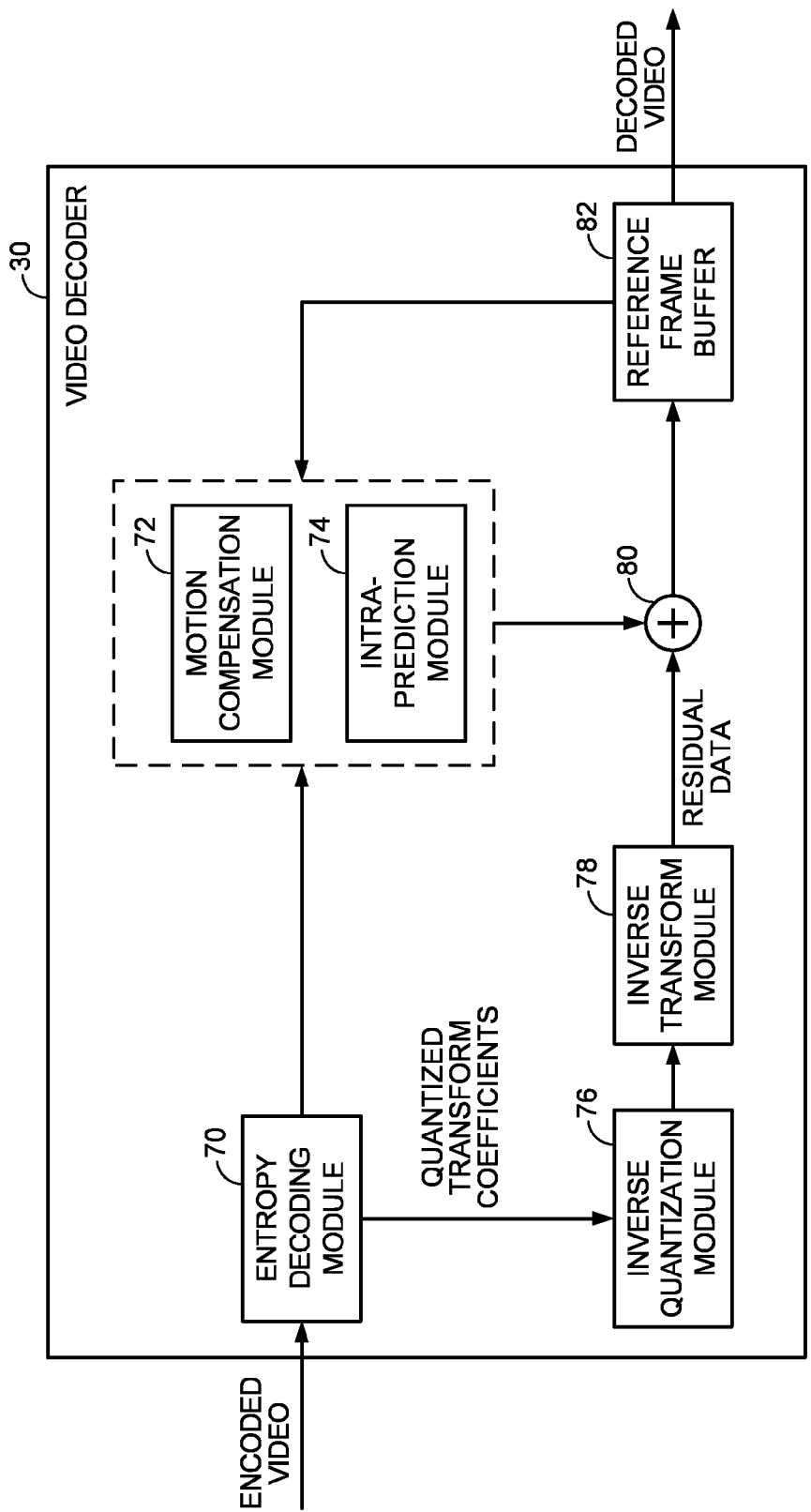
FIG. 3 shows a block diagram illustrating an example of a video decoder that may be implemented in accordance with the disclosed principles.

FIG. 3 shows a block diagram illustrating an example of a video decoder 30 that may be implemented in accordance with the disclosed principles. The video decoder 30 may be configured to perform any or all of the techniques of this disclosure.

In the example of FIG. 3, the video decoder 30 includes an entropy decoding module 70, a motion compensation module 72, an intra-prediction module 74, an inverse quantization module 76, an inverse transformation module 78, a reference frame buffer 82, and a summer 80. The video decoder 30 may, in some embodiments, perform a decoding pass generally reciprocal to the encoding pass described with respect to the video encoder 20 as described in FIG. 2.

Although shown as separate functional modules for ease of illustration, the structure and functionality of any of the components within the video decoder 30 may be highly integrated with one another. For example, in some embodiments, the entropy decoding module 70 may be highly integrated with the inverse quantization module 76.

During the decoding process, the video decoder 30 receives an encoded video bitstream that represents video blocks of an encoded video slice and associated syntax elements, as generated by a video encoder. The bitstream may be received from a variety of sources, including from a file server, from a storage medium, and from a video encoder via a modem, as shown in FIG. 1.

The entropy decoding module 70 may scan the received values using a scan mirroring the scan order used by the entropy encoding module of the video encoder that generated the bitstream (e.g., an inverse zig-zag scan pattern). Additionally, or alternatively, the scan order may be inferred by the video decoder 30 based on characteristics of the coded video such as prediction mode, block size, transform, or other characteristics. No matter how the scan order is determined, the entropy decoding module 70 may use the inverse of the scan order to scan the received one-dimensional vector into a two-dimensional array. The entropy decoding module 70 may then entropy decode the encoded video, which may involve a process that is the inverse of that used by the entropy encoding module 56 of FIG. 2.

The video decoder 30 may receive the associated syntax elements at a video slice level and/or a video block level. The entropy decoding module 70 may further analyze the bitstream to extract quantized coefficients, motion vectors, intra-prediction mode indicators, and other syntax elements. The motion vectors may be received by the motion compensation module 72 and the intra-prediction mode indicators may be received by the intra-prediction module 74.

When the slice is coded as an intra-coded (I) slice, the intra prediction module 74 may generate prediction data for a video block of the current video slice based on an intra-prediction mode indicator and data from previously decoded blocks of the current frame or picture.

When the video frame is coded as an inter-coded (e.g., B, P, or GPB) slice, motion compensation module 72 may produce PUs for a video block of the current video slice based on a motion vector and other syntax information. The PUs may be produced from one of the reference pictures within one of the reference picture lists. The video decoder 30 may construct the reference frame lists (e.g., List 0 and List 1, as defined by the HEVC standard), using default construction techniques based on reference pictures stored in the reference frame buffer 82. The motion compensation module 72 may determine prediction information for a video block by parsing the motion vectors and other syntax information. This prediction information may be used to produce the PUs for the current video block being decoded. For example, motion compensation module 72 may determine a prediction mode (e.g., intra- or inter-), an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation module 72 may also perform interpolation based on interpolation filters. The motion compensation module 72 may use interpolation filters similar to those used by the video encoder that encoded the video blocks to calculate interpolated values for sub-integer pixels of reference blocks. In some embodiments, the motion compensation module 72 may determine the interpolation filters used by the video encoder that generated the bitstream from the received syntax elements and use the interpolation filters to produce predictive blocks.

The inverse quantization module 76 inverse quantizes (e.g., de-quantizes) the quantized transform coefficients provided in the bitstream and decoded by entropy decoding module 70. The inverse quantization process may include use of a quantization parameter, $QP_Y$, calculated by the video decoder 30 for each video block in the video slice to determine a degree of quantization and, likewise, a degree of inverse quantization that may be applied to determine the original transform coefficients, though some quantization error may be present.

The inverse transform module 78 may apply an inverse transform (e.g., an inverse DCT) to form residual data describing residual blocks in a pixel or pixel difference domain. The inverse transform may be the inverse of that used by the transform module 52 of FIG. 2. The inverse transform module 78 may also benefit from the disclosed techniques for improved image transforms.

After the motion compensation module 72 and/or the intra-prediction module 74 generate a PU for the current video block, the video decoder 30 forms a decoded video block by summing the residual block from the inverse transform module 78 with the corresponding PU generated by motion compensation module 72 and/or the intra-prediction module 74. The summer 80 represents the component or components that perform this summation operation. If desired, a deblocking filter may also be applied to filter the decoded blocks in order to remove blockiness artifacts. Other loop filters (e.g., in the coding loop or after the coding loop) may also be used to smooth pixel transitions, or otherwise improve the video quality. The decoded video blocks in a given frame or picture are then stored in the reference frame buffer 82. The reference frame buffer 82 may store this and other reference frames or pictures that may be used for subsequent motion compensation and/or intra-prediction. The reference frame buffer 82 may also store decoded video for presentation on a display device.

Figure 4:
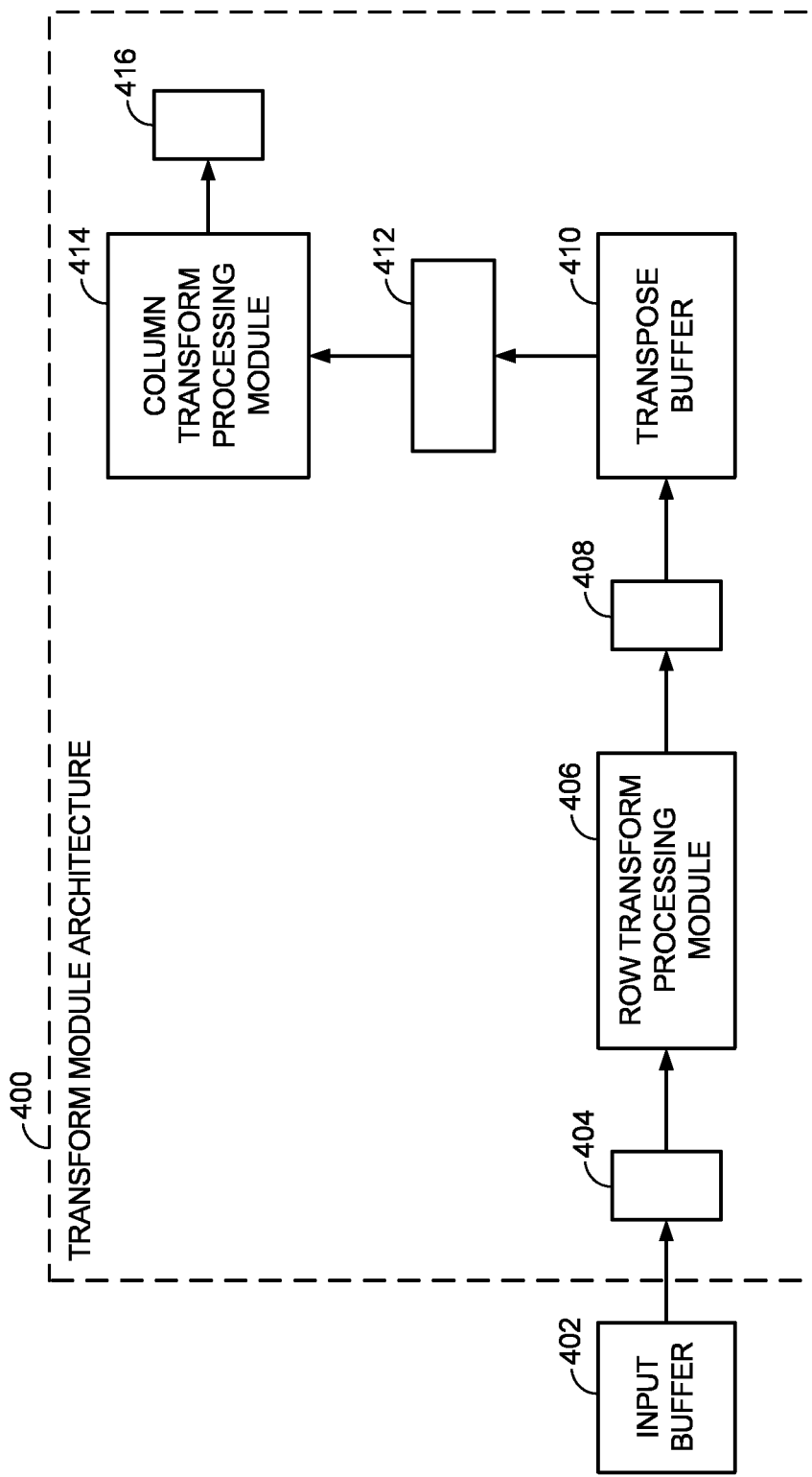
FIG. 4 shows a block diagram illustrating a transform module architecture.

FIG. 4 shows a block diagram illustrating a transform module architecture 400. The transform module architecture 400 may be used to perform transforms in an encoder (e.g., as the transform module 52 in FIG. 2) and/or to perform inverse transforms in an encoder and/or a decoder (e.g., as the inverse transform module 60 in FIG. 2 and/or as the inverse transform module 78 in FIG. 3). The transform module architecture 400 may receive input from an input buffer 402, and the architecture 400 may include a first bus 404, a row transform processing module 406, a second bus 408, a transpose buffer 410, a third bus 412, a column transform processing module 414, and an output bus 416.

In general, image transforms (e.g., DCT and the DST) operate in two dimensions and may be decomposed into one-dimensional row transforms and one-dimensional column transforms, such that the row transforms and the column transforms may be applied at separate stages. This type of decomposition allows the transform processing to be pipelined and can simplify both software and hardware implementations of image transforms. For example, a row transform may be applied first to a matrix of N by N input values (e.g., a TU having a size of N×N), which may in turn create an N by N matrix of intermediate values. A column transform may be applied to the N by N matrix of intermediate values to create an N by N matrix of output values, which may represent the transformed (or inverse-transformed) data. Alternatively, both here and throughout the disclosure, the column transform may occur before the row transform. These techniques are generally utilized by the transform module architecture 400, as will be described below.

In this disclosure, "N×N" and "N by N" may be used interchangeably to refer to the pixel dimensions of a video block in terms of horizontal and vertical dimensions, respectively (e.g., 16×16 pixels or 16 by 16 pixels). In general, a 16×16 block will have 16 pixels in a horizontal direction (x=16) and 16 pixels in a vertical direction (y=16). Likewise, an N×N block generally has N pixels in a horizontal direction and N pixels in a vertical direction, where N represents a nonnegative integer value. The pixels in a block may be arranged in rows and columns Common sizes for blocks (e.g., TUs in HEVC) may include 4×4, 8×8, 16×16, and 32×32. However, blocks need not necessarily have the same number of pixels in the horizontal direction as in the vertical direction. For example, blocks may comprise N×M pixels, where M is not necessarily equal to N.

The input buffer 402 may store an N×N input block of input values that are to be transformed. If the transform module architecture 400 is used to implement a transform module, then the input buffer 402 may store residual pixel values of a residual block. If the transform module architecture 400 is used to implement an inverse transform module, then the input buffer 402 may store transform coefficients (e.g., in a frequency domain) of a transform block. The input buffer 402 may be implemented as any of a variety of buffers (e.g., as an inverse zig-zag buffer).

The input values in the input buffer 402 may be sent to the row transform processing module 406 via the bus 404. At a first transform stage, the row transform processing module 406 may perform N-point row transforms to convert each row of N×1 input values into a corresponding row of N×1 intermediate values.

The row transform may be implemented using any of a variety of techniques known in the art. For example, the HEVC standard defines 4-point, 8-point, 16-point, and 32-point DCTs, as well as a 4-point DST. The transform definitions may involve matrices of coefficients for implementing N-point row transforms (and N-point column transforms) for the different values of N (e.g., 4, 8, 16, and 32). As these transform-dependent coefficient matrices (e.g., kernel matrices) may be both fixed and known in advance, they may be stored in memory to reduce computational overhead. For example, the transform-dependent coefficient matrices for a 32-point DCT may be stored in a lookup table and/or in a set of easily accessible memory registers. The transform-dependent coefficients may be multiplied by the N×1 input values to generate the N×1 intermediate values. It should be noted that these transform-dependent coefficients are distinct from, and may in fact be used to calculate, the transform coefficients that are output by a transform module or received by an inverse transform module.

If another transform is selected, such as a discrete Fourier transform (DFT), a Hadamard transform, a wavelet transform, an integer transform, a sub-band transform, or any of the corresponding inverse transforms, different sets of transform-dependent coefficients may be selected.

The N-point row transforms may be repeated by the row transform processing module 406 for each of the N rows to generate a total of N×N intermediate values from the N×N input block. The intermediate values may be sent the transpose buffer 410 via the bus 408.

The transpose buffer 410 may transfer the intermediate values to the column transform processing module 414 via the bus 412. At a second transform stage, the column transform processing module 414 may apply an N-point column transform to each of the N columns The N-point column transforms may be similar to the N-point row transforms applied by the row transform processing module 406.

By iteratively implementing the N-point column transforms on the N columns, the column transform processing module 414 may determine an N×N block of output values (e.g., transformed or inverse-transformed values). The N×N block of output values may be sent to subsequent processing stages and/or memory via the output bus 416. If the transform module architecture 400 is used to implement a transform module, the output bus 416 may output transform coefficients (e.g., in a frequency domain), which may be received by a quantization module (e.g., the quantization module 54 in FIG. 2). If the transform module architecture 400 is used to implement an inverse transform module, the output bus 416 may output pixel values representing residual data. This residual data may be added to intra-predicted or inter-predicted values to recreate video frames to store in a frame buffer (e.g., the reference frame buffer 64 in FIG. 2 and/or the reference frame buffer 82 in FIG. 3).

Figure 5:
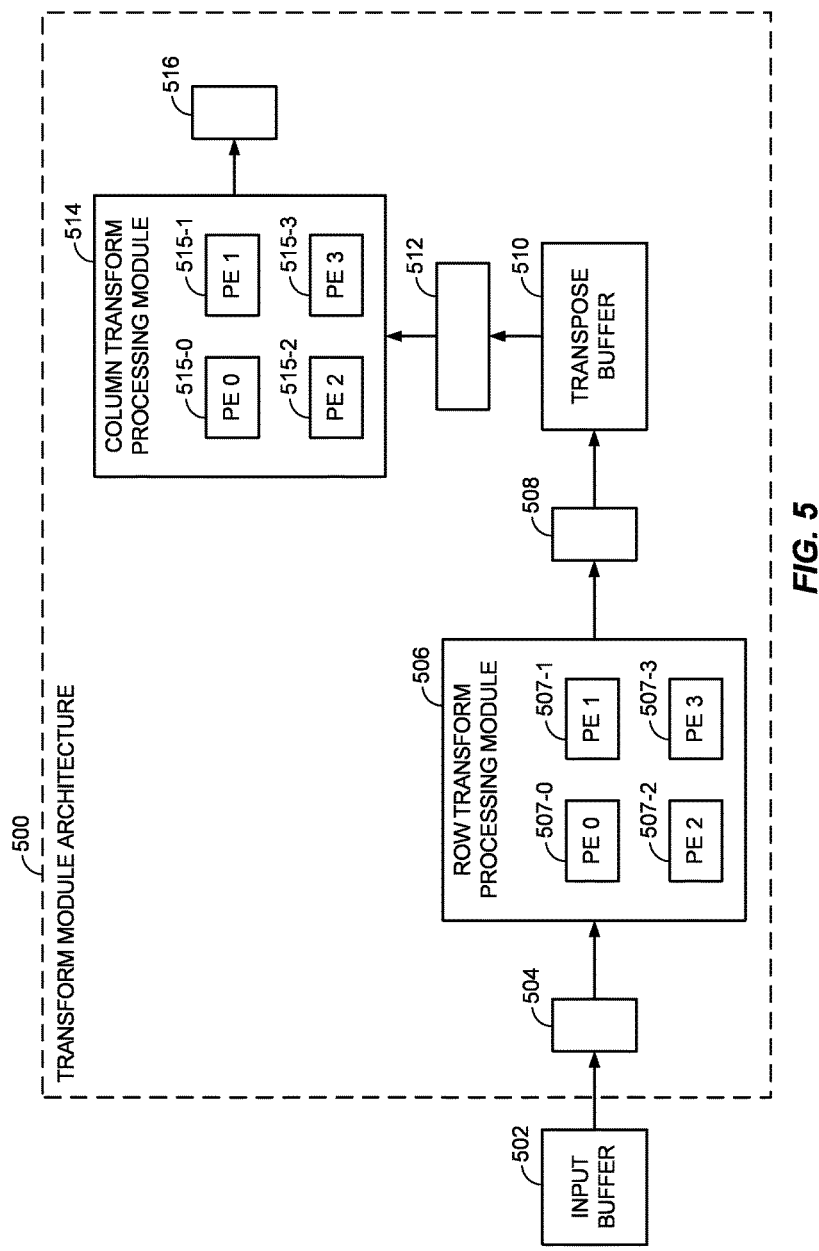
FIG. 5 shows a more detailed block diagram illustrating a transform module architecture in accordance with the disclosed principles.

FIG. 5 shows a more detailed block diagram illustrating a transform module architecture 500 in accordance with the disclosed principles. The transform module architecture 500 may receive input from an input buffer 502, and the architecture 500 may include an input buffer 502, a first bus 504, a row transform processing module 506, a second bus 508, a transpose buffer 510, a third bus 512, a column transform processing module 514, and an output bus 516.

The input buffer 502 may store an N×N array of input values to be transformed. The input buffer 502 may further have a read bandwidth, K, which represents the maximum number of values per cycle that may be sent to the row transform processing module 506 via the bus 504. Within this disclosure, a cycle may represent one or more processing cycles or any other logical interval of time. As will be shown below, the improved transform module architecture 500 may be designed to optimally scale with the read bandwidth, K, to achieve a high level of area- and power-efficiency.

At a first transform stage, the row transform processing module 506 may comprise a plurality of processing engines 507. In the embodiment shown in FIG. 5, four processing engines 507-0 to 507-3 (PE 0-PE 3) may each operate on a common set of K×1 inputs received each cycle from the input buffer 502 via the bus 504. Each processing engine 507 may be tasked with computing different intermediate values using a common, concurrently-received set of inputs. In other words, a plurality of intermediate values may be computed in parallel. For example, when using the same inputs, the processing engine 507-0 may produce a first intermediate value in a row, the processing engine 507-1 may concurrently produce a second intermediate value in the row, the processing engine 507-2 may concurrently produce a third intermediate value in the row, and the processing engine 507-3 may concurrently produce a fourth intermediate value in the row. These intermediate values may each be associated with different columns, and a subset of the columns may be represented by the intermediate values. The row transform processing module 506 may then output a set of the four intermediate values (e.g., one from each processing engine 507) to the transpose buffer 510 via the bus 508.

As each intermediate value may be dependent on each of the N input values in a row of an N×N array, more than one cycle, and more than one read operation from the input buffer 502, may be required to generate intermediate values when K is less than N. A set of N/K read operations may be used to read each of the N values in a row, K values at a time. This process is further explained with respect to FIG. 6.

As discussed above, in the embodiment of FIG. 5, one set of read operations from the input buffer 502 may be result in the generation of four intermediate values. In the example of applying a transform to a 32×32 TU, each pixel (e.g., input value) in the TU would be accessed eight times instead of 32 times due to the concurrent usage of four processing engines. Accordingly, the memory read bandwidth required may be reduced by a factor of four when compared to systems that calculate one intermediate value at a time. This may greatly improve performance in systems with limited memory read bandwidth. When the design of the input buffer 502 is unconstrained, the disclosed principles may further allow for a reduction in the memory read bandwidth required of the input buffer 502, which may decrease die area, power consumption, and design complexity. For example, a 32-point transform may be implemented using an input buffer width (e.g., RAM width) and a bus width of eight instead of 32. Decreasing the width of input buffer 502 may provide significant benefits, as memory width can play as significant role in determining the total die area.

The transpose buffer 510 may operate as a ping-pong buffer. This allows the row transform module 506 to write values to the transpose buffer 510 during a time when the column transform processing module 514 is reading from the transpose buffer 510. When the row transform processing module 506 writes a full block of a predetermined size to the transpose buffer 510 (e.g., a block of 8×4 intermediate values), the block may transfer to the other side of the buffer 510 where it may be read by the column transform processing module 514.

Conventional transpose buffers are generally the same size as the input buffer. As a result, a conventional transpose buffer may take up a large amount of die area, and intermediate values may be stored within the buffer for a relatively long duration before being read by a second transform stage. For example, with an N×N input block, previous implementations of transpose buffers may also have a size of N×N to support holding all of the input values simultaneously. Furthermore, the second transform stages of previous implementations would wait for a full transpose buffer, or at least a full row or column, before they could begin operating on an input. Both of size of transpose buffers and the time required to hold intermediate values may be reduced by the techniques disclosed herein.

Regarding size, the transpose buffer 510 may, in some embodiments, have a size of 2×8×4 (where "2" represents the ping-pong nature of the buffer), which may be smaller than the size of the input block (e.g., 32×32).

Regarding time, as described above, the row transform processing module 506 may write to the buffer 510 in sets of four. After every eight sets of four intermediate values are written to the transpose buffer 510, the intermediate values form a 8×4 block that may be transferred to the other side of the transpose buffer, making the block accessible to the column transform processing module 514. The column transform processing module 514 may immediately begin processing the intermediate values in this block while the row transform processing module 506 is processing another 8×4 block within the same input block. Decreasing the holding time of intermediate values may increase the utilization of the module, which may increase performance, as measured, e.g., by a throughput per die area metric.

In other embodiments, the transpose buffer may range in size, and the size may be represented more generally as 2×A×B, where A and B are nonnegative integers less than or equal to N.

At a second transform stage, the column transform processing module 514 may read the intermediate values from the transpose buffer 510 via the bus 512. The column transform processing module 514 may operate generally similar to the row transform processing module 506. For example, the column transform processing module 514 may also comprise a plurality of processing engines 515-0 to 515-3 (PE 0-PE 3). The column transform processing module 514 may process 8×4 blocks of intermediate values after these blocks are stored in the transpose buffer 510 by the row transform processing module 506.

While four row processing engines 507 are shown in the row transform processing module 506, fewer or more processing engines 507 may be utilized in some embodiments. Further, while four column processing engines 515 are shown in the column transform processing engine 507, fewer or more processing engines 515 may be utilized in some embodiments. In some embodiments, the row transform processing module 506 may have a different number of processing engines than the column transform processing module 514.

Figure 6:
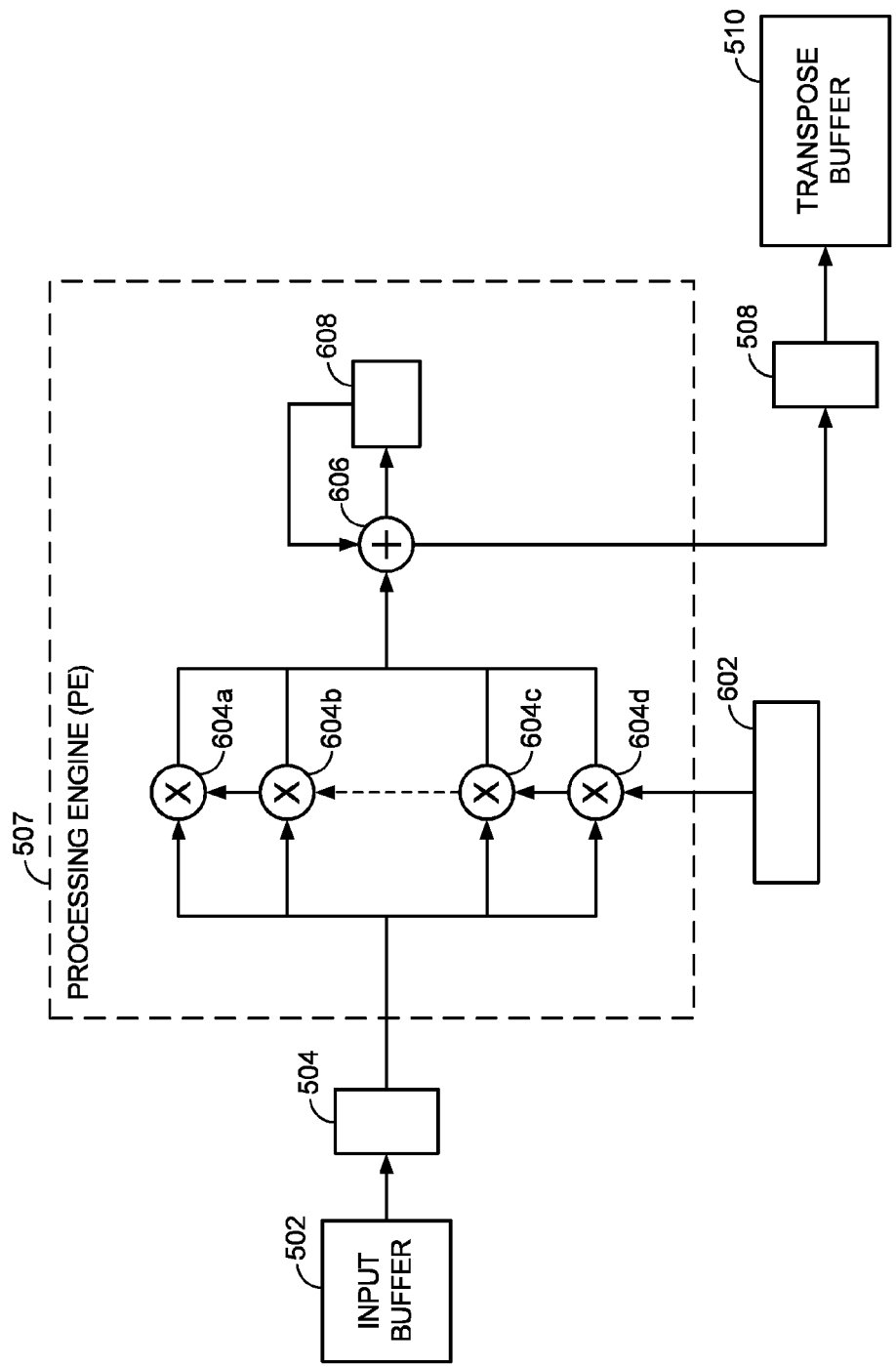
FIG. 6 shows a block diagram illustrating the operation of a processing engine.

FIG. 6 shows a block diagram illustrating the operation of a processing engine 507. The processing engine 507 may be implemented within the row transform processing module 506 of FIG. 5. The processing engine 507 may also be adapted to function as a processing engine 515 within the column transform processing module 514 of FIG. 5, with some modifications as described below.

The processing engine 507 may receive K input values from the input buffer 502 via the bus 504. As described above, K may represent the read bandwidth associated with the input buffer 502. When the processing engine 507 is implemented to perform a row transform, the input values may be within a common row. The processing engine 507 may also receive K transform-dependent coefficients from a bus 602. Each processing engine 507 within a row transform processing module may receive a different set of K transform-dependent coefficients. As described above, these coefficients may be established by a coding standard (e.g., HEVC). These coefficients may, e.g., be 16-bit values. The bus 602 may receive the transform-dependent coefficients from a lookup table and/or a set of easily accessible memory registers.

Within the processing engine 507, each of the K input values may be multiplied with one of the K transform-dependent coefficients from the bus 602 using one of the K multipliers 604. As the number of multipliers changes as a function of the read bandwidth, K, the processing engine 507 (and the transform module architecture as a whole) scales with the memory bandwidth. Further, as the architecture is readily adaptable for a broad range of performance, power, and area constraints, design times and costs may be significantly reduced after one implementation is completed. Exemplary configurations are shown further below, with respect to Table 1.

The output of the K multipliers may be summed by the summer 606 to generate a partial sum. The partial sum may be stored in an accumulation register 608.

If the input buffer 502 has sufficient bandwidth for an entire row to be read in a single cycle (e.g., K=N), then the partial sum may be a complete sum representative of an intermediate value. This intermediate value may be stored in the accumulation register 608 and subsequently sent to the transpose buffer 510 via the bus 508. Alternatively, the accumulation register 608 may be bypassed (or removed entirely), and the output of the summer 606 may be stored directly in the transpose buffer 510 via the bus 508.

However, if the input buffer 502 has limited bandwidth such that an entire row cannot be read in a single cycle (e.g., K<N), then the accumulation register 608 may be used. Each cycle, the accumulation register 608 may store and accumulate the values from the K multiplications of K input values with K transform-dependent coefficients. The accumulation operation may be performed by the summer 606, such that the summer 606 performs a summation of K+1 inputs (e.g., the outputs of the K multipliers 604 and of the accumulation register 608). All N values in a row may be read after N/K cycles. Once the last set of K input values is multiplied by K transform-dependent coefficients and summed together with the contents of the accumulation register, a complete sum representative of an intermediate value may be determined This intermediate value may be stored in the accumulation register 608 and subsequently sent to the transpose buffer 510 via the bus 508. Alternatively, the output of the summer 606 may bypass the accumulation register 608 during this last cycle, such that the intermediate value may be stored directly in the transpose buffer 510 via the bus 508. The accumulation register 608 may be reset to hold a value of zero before computation of the next intermediate value by processing engine 507 begins.

In some embodiments, the multipliers 604 may multiply 8-bit input values received from the input buffer 502 with 16-bit coefficients received from the bus 602. The accumulation register may be capable of holding 25 bits, in the case where the processing engine 507 is used in a first-stage, row transform processing module.

The processing engine 507 may be adapted for use in a second-stage, column transform processing module. As shown in FIG. 5, processing engines 515 in the column transform processing modules 514 may receive input from the transpose buffer 510 via the bus 512. These processing engines 515 may further determine output values which are sent to subsequent stages via the bus 516.

Returning to FIG. 6, when the processing engine 507 is used in a second-stage, column transform processing module, the accumulation registers 608 may increase in size (e.g., to 28 bits). This is because a greater total number of calculations are performed to determine a final value than are performed to determine an intermediate value. Accordingly, a greater level of precision (e.g., more bits) may be beneficial at this later stage to avoid incidents of underflow or overflow. The number of bits stored in the accumulation registers 608 may also be defined by a coding standard.

Figure 7:
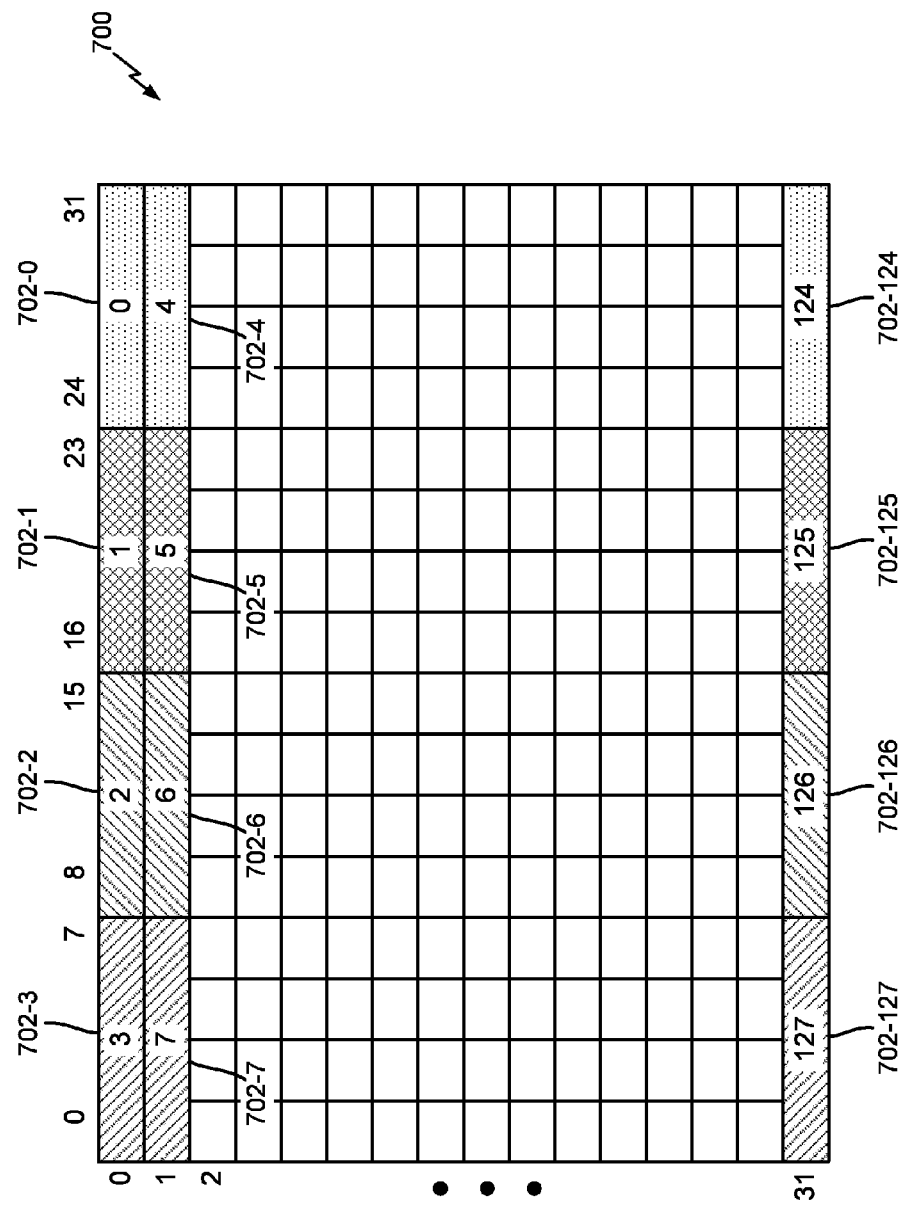
FIG. 7 shows a schematic diagram illustrating an input block that may be transformed in accordance with the disclosed principles.

FIG. 7 shows a schematic diagram illustrating an input block 700 that may be transformed in accordance with the disclosed principles. The input block 700 may, e.g., be a TU having a size of 32×32, which may be stored in an input buffer having a read bandwidth, K, of eight input values per cycle. The block size and memory read bandwidth are selected for exemplary purposes and to simplify the description below. However, other memory read bandwidths and other block sizes may be selected while remaining within the scope of the disclosed principles.

Also for simplifying the discussion below, the embodiment described in FIG. 7 includes a row transform processing module having four processing engines, and a transpose buffer having a size of 2×8×4. However, as noted above, the row transform processing module may have more or less processing engines. Further, the transpose buffer may range in size, and the size may be represented more generally as 2×A×B, where A and B are nonnegative integers that define an A×B block of intermediate values that is smaller than the 32×32 input block.

The partitioning shown in FIG. 7 represents input sets 702 (e.g., groupings of 8 input values) that are received by a row transform processing module. Accordingly, the input sets 702 are represented as lengthwise blocks having a size of 8×1 input values. More generally, the input sets 702 may be K×1 blocks.

At a first transform stage, the row transform processing module may begin processing the block 700 with a first row (row 0), which may comprise four input sets 702-0, 702-1, 702-2, and 702-3. During a first cycle, the input set 702-0 may be received by each of the processing engines of the row transform processing module. Within each processing engine, the same eight input values may be multiplied by a set of eight transform-dependent coefficients (which may be different for each processing engine), summed, and stored in the accumulation register of the corresponding processing engine, as described in FIG. 6. This process may be repeated for the input sets 702-1, 702-2, and 702-3, which may be each be multiplied with different sets of transform-dependent coefficients. After the row transform processing module processes the input set 702-3, the first row (row 0) would be traversed completely (e.g., for a first of eight times) and a first set of intermediate values may be determined If the row transform processing module has four processing engines, four intermediate values may be generated and sent to a transpose buffer. For example, these four intermediate values may be at the intersections of the first row (row 0) with the first four columns (columns 0-3), and each intermediate value may later be used to help determine the output values associated with these four columns The row transform processing module may repeat the process described above for the second row (row 1), which may include input sets 702-4, 702-5, 702-6, and 702-7. The same sets of transform-dependent coefficients that were used for the input set 702-0 in each of processing engines may be used for the input set 702-4. Similarly, the transform-dependent coefficients may be the same between inputs sets 702-1 and 702-5, input sets 702-2 and 702-6, and input sets 702-3 and 702-7. This choice of common transform-dependent coefficients allows for the resulting intermediate values to also be representative of columns 0-3. As a result, the row transform processing module may similarly generate four more intermediate values that may be at the intersections of the second row (row 1) with the first four columns (columns 0-3). This iterative process may repeat for each subsequent row until the eighth row (row 7, not explicitly shown) is processed by the row transform processing module. When the eighth row is completed by the row transform processing module, a full block of 8×4 intermediate values may be determined These intermediate values may fill one side of the 2×8×4 transpose buffer, which may trigger the transpose buffer to allow access of the 8×4 block of intermediate values to the column transform processing module for subsequent processing at a second transform stage.

As evidenced above, the column transform processing module may process intermediate values associated with the input block 700 shortly after the row transform processing module has begun processing the input block 700 (e.g., after $\frac{1}{32}^{nd}$ of the block is processed into intermediate values). In this way, both the first and second transform stages may operate concurrently on an input block (e.g., TU). Consequently, the transpose buffer may be smaller than conventional transpose buffers, and the transpose buffer may also hold intermediate values for relatively fewer cycles. The intermediate values may be stored in the transpose buffer for 8*N/K cycles, which in this example is 32 cycles. After 32 cycles, the second transpose stage may access the intermediate values from the transpose buffer, at which point the corresponding memory locations in the transpose buffer may be free to be overwritten.

The row transform processing module may continue processing input sets 702 until it completes the last row in the input block 700 (e.g., row 31), which has input sets 702-124, 702-125, 702-126, and 702-127. After the last row is processed by the row transform processing module, a total of 32×4 intermediate values may be determined and the fourth 8×4 block may be sent to the column transform processing module. At this stage, a total of four full columns of intermediate values may be processed (or ready to process) by the column transform processing module. As each column transform may require a full column of intermediate values to complete, this allows the column transform processing module to calculate (e.g., completely) the final output values for the first four rows, forming a 32×4 block of output values that may be sent on the output bus to subsequent processing stages and/or memory.

The first row (row 0) may be accessed a second time by the row transform processing module, but new sets of transform-dependent coefficients may be selected for each processing engine. These new sets of transform-dependent coefficients may be selected such that the row transform processing module may generate intermediate values for the next four columns (e.g., columns 4-7). Once these next four columns are processed by the column transform processing module, a second 32×4 block of final values may be sent on the output bus. The process may repeat until eight 32×4 blocks of final values are sent on the output bus, at which point transformation of a new block (e.g., TU), may begin.

While the description of FIG. 7 describes an embodiment where the row transform occurs before the column transform, in some embodiments, the column transform may occur first. In these embodiments, the input sets 702 may be 1×K blocks (e.g., 1×8 blocks), representing input values that are sent into the column transform processing module. A closely analogous procedure may be followed to generate output values, as would be understood by one of ordinary skill in the art.

Further, the direction of the scan order may vary from the order shown in FIG. 7. For example, the row transform processing module may receive input sets from either left-to-right or right-to-left in a given row. Furthermore, the rows may be iterated from top-to-bottom or from bottom-to-top. The transform-dependent coefficients may selected such that the columns are iterated from left-to-right or from right-to-left. Zig-zag, alternating, or other scan patterns may also be used.

FIG. 8 shows a timing diagram illustrating the activity of two transform stages when generating two successive 32×4 block segments of an input block. The timing diagram is associated with an embodiment of a transform module similar to the embodiment associated with FIG. 7. In the embodiment represented by FIG. 8, the input block may have a size of 32×32, the row transform processing module and the column transform processing module may each have four processing engines, and the row transform processing module may operate before the column transform processing module. Further, the input buffer may have a read bandwidth, K, that represents the maximum number of values per cycle that may be read.

Additionally, the timing diagram illustrates a determination of intermediate and output values that proceeds from left to right (e.g., starting with the leftmost columns 0-3 and finishing with the rightmost columns 28-31). However, the relative order of determining output values may vary (e.g., determining output values for the rightmost columns first).

The first timeline 802 of the timing diagram represents the timing of blocks processed by a row transform processing module at a first transform stage. The second timeline 804 of the timing diagram represents the timing of blocks concurrently processed by a column transform processing module at a second transform stage.

As shown in the timeline 802, the row transform processing module may process one row over each time period 810. As each row in a 32×32 block may contain 32 input values, and because the input buffer may have a read bandwidth of K, the each time period 810 may take 32/K cycles. However, the exact number of cycles may still vary depending on delays due to processing and other factors. Each of the 32 rows may be processed over a time period 820-1, thereby generating the equivalent of 32×4 intermediate values. As the time period 820-1 includes 32 of the time periods 810, the duration of the time period 820-1 may be 32*32/K. At the end of the time period 820-1, the row transform processing module may finish generating 32×4 intermediate values, representing the first four columns (columns 0-3).

These intermediate values may be used by the column transform processing module to generate final values for the first four columns (columns 0-3), starting at the beginning of the time period 822-1. While the column transform processing module is still generating these final values, the row transform processing engine may determine intermediate values for the next four columns (columns 4-7) over a time period 820-2, which may also last 32*32/K cycles. Again, the durations and relative timings are merely exemplary, and other durations and relative timings may be used.

The row transform processing module may continue to operate on the input block until intermediate values for all 32 columns are generated, at which point the row transform processing module may begin processing input values for another block.

It may be noted that because the transpose buffer may be smaller than 32×4, the intermediate values generated over each time period 820 may not actually be assembled as a 32×4 block at any one time. Instead, the intermediate values may be sent to the column transform processing module in four 8×4 blocks at the end of each time period 820.

The column transform processing module may begin operating on the input block after a delay 830 associated with filling up a 8×4 block of intermediate values in the transpose buffer. As reading each row may take 32/K cycles, and because eight rows may be read to generate a 8×4 block of intermediate values, the delay 830 may last 8*32/K cycles, after which point the column transform processing module may begin operating on the intermediate values. Because the column transform processing module need not wait for the entire input block to be transformed, the delay 830 may be much smaller than that associated with conventional transform module architectures.

After the delay 830, the column transform processing module may generate a 32×4 block of final values for the first four columns (columns 0-3) over a time period 822-1, which may have the same duration as the time period 820-1, during which time the row transform processing module generates the corresponding intermediate values.

Upon completion, the column generation processing module may begin processing a 32×4 block for the next four columns (columns 4-7) over a time period 822-2. As shown by the timeline 804, the time period 822-2 may begin immediately after the time period 822-1. This lack of delay between processing the first 32×4 block and the second 32×4 block may be attributed to the concurrently operational row transform processing module and the efficiency of the transpose buffer implementation as a ping-pong buffer. This process may continue until final values representative of the entire 32×32 block are output on the output bus, at which point the column transform processing module may begin processing intermediate values of another block.

In some embodiments, the column transform processing module and the row transform processing module operate at different rates, such that the time periods 820 are different from the time periods 822. In these embodiments, either the row transform processing module or the column transform processing module may have unutilized time, depending on which module is quicker.

As described above, the transform module architecture is readily adaptable for a broad range of performance, power, and area constraints. Table 1 below shows various configurations in accordance with the disclosed principles. In all of these architectures, the number of processing engines may be fixed (e.g., to four PEs in each of the row transform processing module and the column transform processing module), and the size of the transpose buffer may also be fixed (e.g., to 2×8×4). However, in other embodiments, the size of the transpose buffer and/or the number of PEs may be varied.

TABLE 1

|  | Configuration 1 | Configuration 2 | Configuration 3 | Configuration 4 |
| --- | --- | --- | --- | --- |
| Cycle Count Budget for 16 × 16 TU | 100 | 200 | 400 | 800 |
| Input Buffer Size | 64 × 512 | 128 × 256 | 256 × 128 | 512 × 64 |
| Number of multipliers in each PE | 128 | 64 | 32 | 16 |
| Input Buffer Read Bandwidth | 32 | 16 | 8 | 4 |
| Area (um$^2$) | 138930 | 78643 | 48500 | 34047 |

The values shown in Table 1 were measured or otherwise determined with respect to hardware designs running at 400 MHz using a 28 nm technology node. The technology node and operating frequency are purely exemplary and other technology nodes and/or operating frequencies may be used.

The configurations shown in Table 1 represent a broad range of performance requirements. For example, Configuration 1 may be selected on high-end coding devices designed to encode and/or decode video, e.g., having Ultra High Definition (UHD) resolution (3,840 by 2,160 pixels or greater). Configurations 2 and 3 may be oriented towards mid-level devices (e.g., 1080p), and Configuration 4 may be oriented towards low-end devices (e.g., 720p).

In each of these embodiments, the amount of time allowed for a given block (e.g., 16×16 TU) may vary. When lower performance is required, the cycle count budget may be decreased. The architecture may accordingly scale by reducing the input buffer read bandwidth, K, and the number of multipliers in each PE. When this reduction is performed, the associated die area may be reduced. The scalability may reduce or eliminate the requirement of redesigning an architecture for different performance requirements. Accordingly, both time and cost may be saved through a scalable architecture in accordance with the disclosed principles.

While various embodiments in accordance with the disclosed principles have been described above, it should be understood that they have been presented by way of example only, and are not limiting. Thus, the breadth and scope of the disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

While the disclosure primarily discusses two-dimensional transforms, the principles described herein may be equally applicable to higher dimensional transforms, such as those used in the three-dimensional extension to HEVC. However, in the multidimensional case, additional transpose buffers may be needed to provide a buffer for each subsequent stage.

Various terms used in the present disclosure have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," "identical," and the like should be understood to mean "substantially at the time," "substantially equivalent," "substantially during," "substantially complete," "substantially identical," etc., where "substantially" means that such comparisons, measurements, and timings are practicable to accomplish the implicitly or expressly stated desired result.

Where the term "block" is used, this may refer to any of a coding unit (CU), prediction unit (PU), or transform unit (TU), in the context of HEVC, or similar data structures in the context of other coding standards (e.g., macroblocks and sub-blocks thereof in H.264/AVC).

Where dimensions are given (e.g., 2×8×4), the units may refer to pixel values, intermediate values, transform coefficients, or any other unit of data, depending on context. Furthermore, the dimensions may reflect a conceptual grouping of information, which need not be physically arranged as such, e.g., in memory.

Additionally, the section headings herein are provided for consistency with the suggestions under 37 C.F.R. 1.77 or otherwise to provide organizational cues. These headings shall not limit or characterize the subject matter set forth in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any subject matter in this disclosure. Neither is the "Summary" to be considered as a characterization of the subject matter set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A processor system for applying an image transform to an input block comprising successive sets of input values, each set of input values comprising one or more successive pixels in the input block, the processor system comprising:
   a first processor circuit operable to receive a first set of input values in the input block and a second set of input values in the input block and further operable to iteratively transform the first set of input values into a first set of intermediate values and the second set of input values into a second set of intermediate values;
   a buffer unit having a first side and a second side, operable to:
      receive, at the first side, the first set of intermediate values and the second set of intermediate values, and transfer the first set of intermediate values and the second set of intermediate values from the first side to the second side,
      the buffer unit having a size that is smaller than a size of the input block; and
   a second processor circuit operable to receive the first set of intermediate values and the second set of intermediate values from the second side of the buffer unit and further operable to iteratively transform the first set of intermediate values into a first set of output values and the second set of intermediate values into a second set of output values,
   wherein the first processor circuit is operable to begin transforming at least some of the second set of input values before the second processor circuit has finished transforming all of the first set of intermediate values,
   wherein the first processor circuit is operable to begin transforming at least some of the first set of input values concurrent to the second processor circuit transforming at least some of the first set of intermediate values, and
   wherein the first processor circuit is operable to transform a common subset of the first set of input values into a first intermediate value of the first set of intermediate values and a second intermediate value of the first set of intermediate values in parallel.

2. The processor system of claim 1, wherein the first processor circuit is operable to write to the buffer unit during a time when the second processor circuit is reading from the buffer unit.

3. The processor system of claim 2, wherein the buffer unit has a size of 2×8×4 intermediate values.

4. The processor system of claim 1, wherein the first processor circuit is a row transform processing module, and wherein the second processor circuit is a column transform processing module.

5. The processor system of claim 4, wherein the row transform processing module is operable to begin processing all rows of the input block that are associated with the second set of input values before the column transform processing module has finished performing column transforms on the first set of intermediate values.

6. The processor of system claim 1, wherein the first and second processor circuits at least partly implement a discrete cosine transform (DCT).

7. The processor of system claim 1, wherein the first and second processor circuits at least partly implement an inverse discrete cosine transform (IDCT).

8. The processor system of claim 1, wherein the input block comprises a residual block and each of the input values comprises a residual pixel value.

9. The processor system of claim 1, wherein the input block comprises a transform block and each of the input values comprises a transform coefficient.

10. A method of applying an image transform to an input block comprising successive sets of input values, each set of input values comprising one or more successive pixels in the input block, the method comprising:
  storing, at an input buffer unit, a first set of input values in the input block and a second set of input values in the input block;
  receiving, at a first processor circuit, the first set of input values and the second set of input values;
  transforming, by the first processor circuit, the first set of input values into a first set of intermediate values using an iterative technique;
  receiving, at a first side of a buffer unit having the first side and a second side, the first set of intermediate values, the buffer unit having a size that is smaller than a size of the input block;
  transferring, at the buffer unit, the first set of intermediate values and the second set of intermediate values from the first side to the second side;
  receiving, at a second processor circuit, the first set of intermediate values from the second side of the buffer unit;
  transforming, by the second processor circuit, at least some of the first set of intermediate values using an iterative technique;
  transforming, by the first processor circuit, at least some of the second set of input values before all of the first set of intermediate values have been transformed by the second processor circuit; and
  transforming, by the first processor circuit, at least some of the first set of input values concurrent to the second processor circuit transforming at least some of the first set of intermediate values,
  wherein the first processor transforms a common subset of the first set of input values into a first intermediate value of the first set of intermediate values and a second intermediate value of the first set of intermediate values in parallel.

11. The method of claim 10, wherein the first processor circuit is operable to write to the buffer unit during a time when the second processor circuit is reading from the buffer unit.

12. The method of claim 11, wherein the buffer unit has a size of 2×8×4 intermediate values.

13. The method of claim 10, wherein the first processor circuit is a row transform processing module, and wherein the second processor circuit is a column transform processing module.

14. The method of claim 13, further comprising:
  performing, by the row transform processing module, row transforms on at least some of the second set of input values before the column transform processing module has finished performing column transforms on the first set of intermediate values.

15. The method of claim 10, wherein the input block comprises a residual block and each of the input values comprises a residual pixel value.

16. The method of claim 10, wherein the input block comprises a transform block and each of the input values comprises a transform coefficient.

17. A video encoder for encoding a video data stream, the video encoder comprising:
  a processor system for applying an image transform to an input block comprising successive sets of input values, each set of input values comprising one or more successive pixels in the input block, the processor system comprising:
    a first processor circuit operable to receive a first set of input values in the input block and a second set of input values in the input block and further operable to iteratively transform the first set of input values into a first set of intermediate values and the second set of input values into a second set of intermediate values;
    a buffer unit having a first side and a second side, operable to:
      receive, at the first side, the first set of intermediate values and the second set of intermediate values, and
      transfer the first set of intermediate values and the second set of intermediate values from the first side to the second side,
      the buffer unit having a size that is smaller than a size of the input block; and
    a second processor circuit operable to receive the first set of intermediate values and the second set of intermediate values from the second side of the buffer unit and further operable to iteratively transform the first set of intermediate values into a first set of output values and the second set of intermediate values into a second set of output values,
    wherein the first processor circuit is operable to begin transforming at least some of the second set of input values before the second processor circuit has finished transforming all of the first set of intermediate values,
    wherein the first processor circuit is operable to begin transforming at least some of the first set of input values concurrent to the second processor circuit transforming at least some of the first set of intermediate values, and
    wherein the first processor circuit is operable to transform a common subset of the first set of input values into a first intermediate value of the first set of intermediate values and a second intermediate value of the first set of intermediate values in parallel;
  a quantization processor operable to quantize the first and second sets of output values into quantized values; and
  an entropy encoding processor operable to entropy encode the quantized values into encoded values that are provided in the video data stream.

18. The video encoder of claim 17, wherein the video data stream is sent to at least one of a video decoder, a file server, and a storage medium.

19. The video encoder of claim 17, wherein the first processor circuit is operable to write to the buffer unit during a time when the second processor circuit is reading from the buffer unit.

20. The video encoder of claim 19, wherein the buffer unit has a size of 2×8×4 intermediate values.

21. The video encoder of claim 17, wherein the first processor circuit is a row transform processing module, and wherein the second processor circuit is a column transform processing module.

22. The video encoder of claim 21, wherein the row transform processing module is operable to begin processing all rows of the input block that are associated with the second set of input values before the column transform processing module has finished performing column transforms on the first set of intermediate values.

23. The video encoder of claim 17, wherein the transform processor implements a discrete cosine transform (DCT).

24. A video decoder for decoding a video data stream, the video decoder comprising:

an entropy decoding processor operable to entropy decode values received from the video data stream into decoded values;

an inverse quantization processor operable to inverse quantize the decoded values, enabling formation of an input block comprising successive sets of input values, each set of input values comprising one or more successive pixels in the input block, for a subsequent processor; and an inverse transform processor system for applying an image transform to the input block comprising the input values, the inverse transform processor system comprising:

a first processor circuit operable to receive a first set of input values in the input block and a second set of input values in the input block and further operable to iteratively transform the first set of input values into a first set of intermediate values and the second set of input values into a second set of intermediate values;

a buffer unit having a first side and a second side, operable to:

receive, at the first side, the first set of intermediate values and the second set of intermediate values, and transfer the first set of intermediate values and the second set of intermediate values from the first side to the second side, the buffer unit having a size that is smaller than a size of the input block; and a second processor circuit operable to receive the first set of intermediate values and the second set of intermediate values from the second side of the buffer unit and further operable to iteratively transform the first set of intermediate values into a first set of output values and the second set of intermediate values into a second set of output values, wherein the first processor circuit is operable to begin transforming at least some of the second set of input values before the second processor circuit has finished transforming all of the first set of intermediate values;

wherein the first processor circuit is operable to begin transforming at least some of the first set of input values concurrent to the second processor circuit transforming at least some of the first set of intermediate values; and wherein the first processor circuit is operable to transform a common subset of the first set of input values into a first intermediate value of the first set of intermediate values and a second intermediate value of the first set of intermediate values in parallel.

25. The video decoder of claim 24, wherein the output values form a residual block which is added to an output from a motion compensation module or an intra-prediction module to form a reconstructed block.

26. The video decoder of claim 25, wherein the reconstructed block is stored in a reference frame buffer as part of a reference frame.

27. The video decoder of claim 24, wherein the first processor circuit is operable to write to the buffer unit during a time when the second processor circuit is reading from the buffer unit.

28. The video decoder of claim 27, wherein the buffer unit has a size of 2×8×4 intermediate values.

29. The video decoder of claim 24, wherein the inverse transform processor implements an inverse discrete cosine transform (IDCT).

* * * * *